United States Patent [19]

Wardlaw, III

[11] Patent Number: 4,596,135

[45] Date of Patent: Jun. 24, 1986

[54] METHOD FOR TESTING INTEGRITY OF WELDS AT ELEVATED TEMPERATURES

[76] Inventor: Louis J. Wardlaw, III, P.O. Box 219061, Cypress, Tex. 77218

[21] Appl. No.: 746,984

[22] Filed: Jun. 19, 1985

[51] Int. Cl.⁴ ............................................. G01M 3/22
[52] U.S. Cl. .................................................... 73/40.7
[58] Field of Search ..................................... 73/40.7, 40

[56] References Cited

U.S. PATENT DOCUMENTS 4,513,605 4/1985 Hawerkamp ........................... 73/40

FOREIGN PATENT DOCUMENTS 1658 1/1976 Japan ........................................ 73/40
48630 4/1980 Japan ..................................... 73/40.7
214832 12/1983 Japan ..................................... 73/40.7

Primary Examiner—Stewart J. Levy
Assistant Examiner—Joseph W. Roskos
Attorney, Agent, or Firm—Gunn, Lee & Jackson

[57] ABSTRACT

In a method for testing the integrity of welds at elevated temperatures, a pressurized gas mixture is injected in an area between the inner and outer weld of a terminal flange welded to a tubular pipe section or casing. The pressurized gas mixture includes a marker gas which is detected by a detection apparatus which scans the weld. The pressure of the gas mixture is also monitored to observe losses in pressure indicative of flaws in the welds. The integrity of the welds is tested at elevated temperature permitting remedial repairs to be made without reheating the tubular pipe or casing.

8 Claims, 2 Drawing Figures

METHOD FOR TESTING INTEGRITY OF WELDS AT ELEVATED TEMPERATURES

BACKGROUND OF THE DISCLOSURE

This invention is directed to a method for testing the integrity of welds, particularly, a process for pressure testing the integrity of welds at elevated temperatures using a pressurized gas mixture to locate flaws which may be present in the welds.

In drilling an oil well, it is often necessary to install wellheads of various sizes of large diameter pipe. Several sizes of pipe or casing may be installed in a well. The well might include, as an example, a 36 inch driver pipe. There may also be a 20 inch casing, 13 and ⅜ inch casing and 9 and ⅝ inch casing. It is necessary to install a terminate flange or wellhead at every change of size. The wellhead is typically installed by first cutting the casing, preheating the casing, then welding the wellhead in place. The wellhead is necessary to mount other equipment or to otherwise install the next casing string. Often, this procedure requires cutting a very thick wall casing, even in the range of 1½ inch thick and thereafter making a multi-pass welded bead to attach the wellhead. To obtain a quality weld, the temperature of the pipe in the area of the weld must be raised to the welding temperature of the pipe or casing prior to actual welding. A typical welding temperature for pipe or casing material is in the range of 500° F. Consequently, a tremendous amount of preheating is required to obtain a quality weld.

Preheating is often a problem, particularly for drilling rigs located at sea. In inclement weather, wind shields must be installed and a number of welders will position their torches on the casing and wellhead to preheated for perhaps 4 to 6 inches below the casing head in length to perhaps 500° F. This is difficult and time consuming.

Certain devices have been provided heretofore to serve as preheaters. In U.S. Pat. No. 4,507,082 to Wardlaw, the inventor of the present disclosure, a preheating apparatus is described which heats the casing and wellhead from the interior. Other preheater devices are also available as typified by the patent of Jaeger, U.S. Pat. No. 3,082,760.

While a number of apparatus have been developed for preheating the casing and wellhead to welding temperatures, relatively little has been done in the area of testing or proving the integrity of the welds. The integrity of the welds connecting the wellhead or terminal flange to the casing, however, is critical to the safe completion of a well. When drilling an oil well, tremendous pressures may be encountered requiring that all connections or welds be leak-proof. This is particularly true for connection of the wellhead which includes other apparatus mounted thereon.

It has long been recognized that proving the integrity of welds is desirable and necessary when drilling an oil well. To this end, terminal flanges or wellheads are provided with an internal circumferential groove, which groove is located between the inner and outer weld upon welding the wellhead to the casing. A port provides access to the groove. Thus, the conventional method for testing the integrity of welds includes the connection of a pressure pump to the port and pumping fluid into the groove and observing any pressure losses. Fluids such as oil, water, or antifreeze are typically used. Prior to injection of the fluid, however, the casing must be permitted to cool to approximately 200° F. or less to avoid thermal shock at the weld. Rapid cooling can damage the metalurgy of the casing and wellhead material. The customary method of proving the integrity of welds is to permit the wellhead casing to gradually cool to a temperature of 200° F. or less prior to injection of a fluid into the test groove to verify that no flaws or cracks are present in the welds. This procedure is very time consuming and in the event that flaws in the weld are located, the wellhead and casing must be reheated to the welding temperature to repair the flaws or cracks located in the initial welds. In addition, the test groove must be cleaned of injection fluid prior to reheating.

The system of the present disclosure overcomes the disadvantages of prior art weld verification. The process of the present disclosure may be carried out at elevated temperatures thereby eliminating the time consuming cool down period prior to testing and the reheating period in the event remedial repairs to the welds required.

SUMMARY OF THE INVENTION

The present disclosure is directed to a system and process for verifying the integrity of welds at elevated temperatures. The system comprises a pressurized container of a gas mixture for connection to a wellhead injection port. The gas mixture is injected through the injection port at the elevated welding temperature and at sufficient pressure to adequately test the integrity of the welds, thereby locating the presence of any cracks or leaks. The gas mixture includes a marker gas which is detected by a detection apparatus passed over the weld of interest. Leaks or other flaws in the welds may also be observed by monitoring the pressure gauge on the gas container for any loss of pressure which would indicate the presence of a leak.

BRIEF DESCRIPTION OF THE DRAWINGS

So that the manner in which the above recited features, advantages and objects of the present invention are attained and can be understood in detail, a more particular description of the invention briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENT

Figure 1:
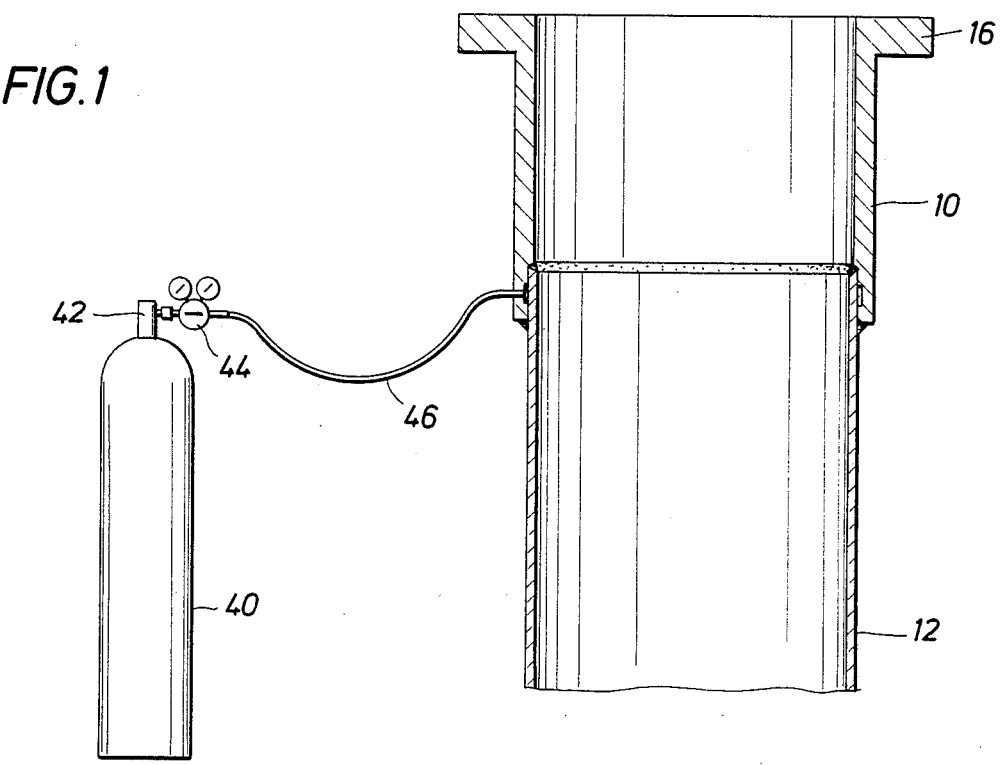
FIG. 1 is a cross-sectional environmental view illustrating the system of the present disclosure connected to test the integrity of the welds connecting a wellhead to a casing.

Attention is first directed to FIG. 1 of the drawings which shows the general configuration of the system for verifying the integrity of the welds connecting a wellhead or terminal flange 10 to a casing 12. Assume, for purposes of illustration, that the casing 12 is a large diameter casing having a wall thickness conforming with industry standards. The casing 12 can range from ½ inch thick to about 1½ inch or greater. The wellhead 10 is connected to the casing 12. The wellhead 10 is constructed with an internal shoulder 14 to abut the end of the casing 12. The wellhead 10 is generally cylindrical and open at each end. A peripheral, outwardly extending flange 16 is provided about the upper end of the wellhead 10 for connection to other equipment. At the opposite end of the wellhead 10, a cylindrical portion 18 extends from the shoulder 14 which telescopes over the end of the casing 12. The end or edge of the cylindrical portion 18 is defined by a flat circumferential surface 20. A multi-pass bead 22 is formed joining the surface 20 and the external surface of the casing 12. Inside a finish bead 24 is formed joining the end 26 of the casing 12 to the shoulder 14 of the wellhead 10. The bead 22 is formed first to fully and completely anchor the wellhead 10 to the casing 12. The weld 22 is a high quality weld, subject to 100% inspection, and must usually be formed in many passes.

Prior to welding, it is very important to preheat the casing 12 to a specified temperature, typically in the range of 500° F. Failure to evenly preheat the casing 12 may damage the welds 22 and 24. Likewise, rapid cooling after the welds 22 and 24 have been formed may crack or fracture the welds 22 and 24.

Figure 2:
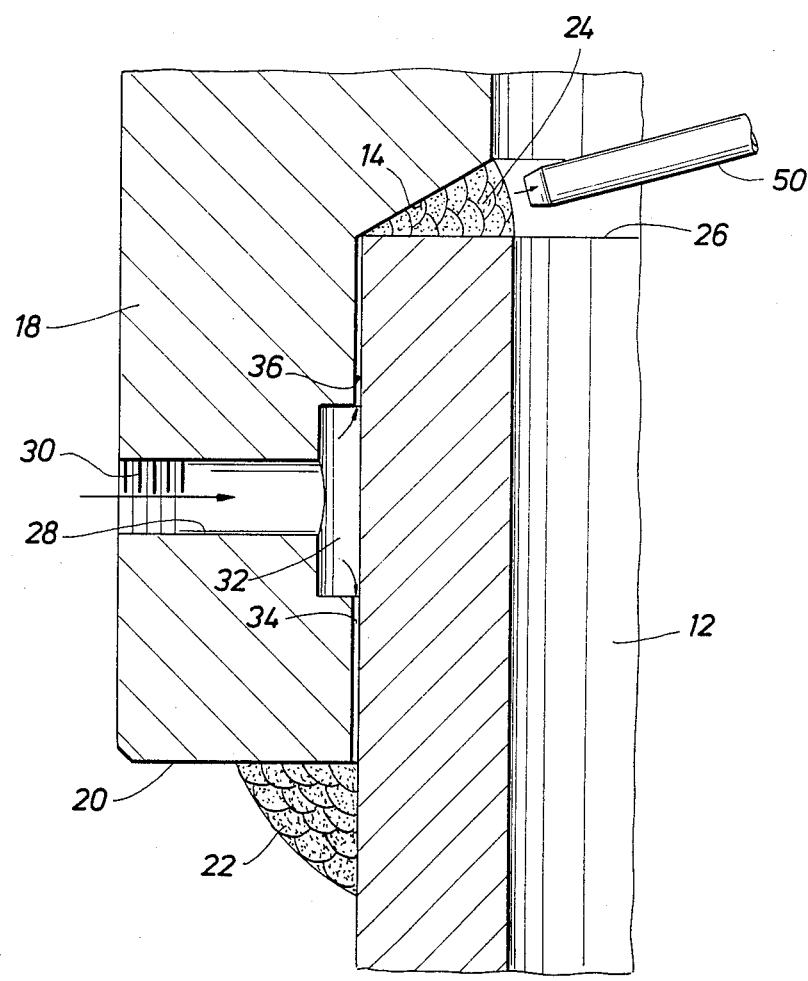
FIG. 2 is an enlarged cross-sectional view of the welds and injection port illustrating the fluid communication established between the injection port and the welds.

As previously mentioned, it is a well known practice to test the integrity of the welds 22 and 24. To this end, the cylindrical portion 18 is provided with an injection port 28. The injection port 28 is internally threaded at 30 and opens into a circumferential groove 32 formed on the internal cylindrical surface of the cylindrical portion 18. When the cylindrical portion 18 is telescoped over the end of the casing 12 as shown in FIG. 2, the groove 32 and casing 12 form a fluid chamber or gap therebetween.

The wellhead 10 and casing 12 are sized so that when telescoped together, a metal-to-metal contact is established between the internal surface of the cylindrical portion 18 and the external surface of the casing 12. For illustrative purposes, however, gaps 34 and 36 are shown in FIG. 2 to illustrate that fluid communication is established between the welds 22, 24 and the fluid chamber or groove 32.

Referring now to FIG. 1, the pressurized container 40 of the system of the present disclosure is shown connected to the injection port 28. The container 40 is a high pressure gas canister provided with a valve 42, which in turn is connected to pressure gauges 44. A high pressure hose or tubing 46 is provided with a threaded connector at one end for connection to the injection port 28 at 30, thereby establishing fluid communication between the pressurized container 40 and the weld beads 22 and 24.

The pressurized container 40 contains a mixture of gases. The gas mixture provides sufficient pressure within industry standards, typically in the range of 150–1500 psi to test for any flaws or cracks which may be present in the weld beads 22 and 24. The gas mixture also includes a marker gas which may be easily detected as it leaks through the welds 22 and 24. By way of example and for illustrative purposes only, compressed nitrogen may be used to supply the pressure necessary for testing the integrity of the welds 22 and 24. A halocarbon or hydrocarbon gas, which is easily detectable at very low concentrations, may be utilized as the marker gas in the pressurized gas mixture of the system of the present disclosure. It is understood, however, that other gases may also be used to form the gas mixture. The system of the present invention requires only that the gas mixture provide sufficient pressure and that the marker gas be detectable at relatively small concentrations.

To illustrate the benefits of the system described herein, it will be recalled that the pressurized container 40 is connected to the injection port 28 upon completion of the weld beads 22 and 24. The temperature of the wellhead 10 and casing 12 is substantially near the welding temperature, having cooled only slightly while the connection at 30 is made. The valve 42 is opened permitting compressed gas from the canister 40 to be injected into the groove 32. The valve 42 is closed and the pressure gauges 44 are monitored and loss of pressure is noted indicating that a flaw is present in the welds 22 and 24. The pressure gauges 44 provide the first indication of a flaw in the weld beads. Each of the weld beads 22 and 24, however, is also checked with a marker gas detecting apparatus. A probe 50 connected to the marker gas detecting apparatus is passed over the welds 22 and 24 for detecting the marker gas passing through the welds 22 and 24. The detecting apparatus is calibrated to register very small concentrations of the marker gas, even in the range of parts per billion. Thus, the system of the present disclosure provides an effective means for locating flaws in the weld beads 22 and 24 at an elevated temperature substantially near the welding temperature.

If a leak is detected, the location and extent of the flaw can be determined by passing the probe 50 over the welds 22, 24 and observing the concentration of the marker gas registered by the marker gas detecting apparatus. The flaw is then ground out and remedial work is done while the wellhead 10 and casing 12 are still at the welding temperature. If no leaks are detected, the welds 22 and 24 may be conveniently retested when the wellhead temperature drops to ambient levels insuring that no flaws have developed in the well beads 22 and 24 during the cooling process.

While the foregoing is directed to the preferred embodiment of the present invention, other and further embodiments of the invention may be devised without departing from the basic scope thereof, and the scope thereof is determined by the claims which follow.

What is claimed is:

1. A method of detecting flaws in a weld connecting a wellhead to a casing, the method comprising the steps of:
   (a) connecting a source of pressurized gas to an injection port in the wellhead in fluid communication with the weld, said pressurized gas comprising a gas mixture including a marker gas;
   (b) injecting said pressurized gas mixture through said injection port while the weld is at an elevated temperature;
   (c) monitoring the source of pressurized gas for detecting losses in pressure; and
   (d) passing a gas detector probe over the weld for detecting gas leaking through the world.

2. The method of claim 1 wherein said marker gas is a halocarbon.

3. The method of claim 1 wherein said marker gas is a hydrocarbon.

4. The method of claim 1 wherein fluid communication is established between said pressurized gas and the weld while the temperature of the wellhead is at substantially 500° F.

5. A system for determining flaws in a weld connecting a terminal flange to a pipe, comprising:
   (a) a source of pressurized gas for connection to a wellhead injection port establishing fluid communication between said source of pressurized gas and said weld;
   (b) a gas detector probe for detecting gas leaking through said weld; and
   (c) wherein fluid communication is established between said pressurized gas and said weld while the weld is maintained at an elevated welding temperature for detecting flaws in said weld at said elevated temperature.

6. The system of claim 5 wherein said pressurized gas comprises a gas mixture including a marker gas.

7. The system of claim 6 wherein said marker gas is a halocarbon.

8. The system of claim 6 wherein said marker gas is a hydrocarbon.

* * * * *